(12) United States Patent
Van Dingenen et al.

(10) Patent No.: US 12,292,088 B2
(45) Date of Patent: May 6, 2025

(54) WET CLUTCH PRESSURE CONTROL

(71) Applicant: Dana Belgium N.V., Flanders (BE)

(72) Inventors: Joachim Van Dingenen, Drongen (BE); Jessica Versini, Bruges (BE); Jan A. Bedert, Oostduinkerke (BE); Filip D. Schacht, Meulebeke (BE); Hein Nevejant, Houthulst (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/643,274

(22) Filed: Apr. 23, 2024

(65) Prior Publication Data

US 2024/0360879 A1    Oct. 31, 2024

Related U.S. Application Data

(60) Provisional application No. 63/499,145, filed on Apr. 28, 2023.

(51) Int. Cl.
*F16D 25/0638* (2006.01)
*F16D 48/02* (2006.01)

(52) U.S. Cl.
CPC ......... *F16D 25/14* (2013.01); *F16D 25/0638* (2013.01)

(58) Field of Classification Search
CPC .................................................. F16D 25/0638
See application file for complete search history.

(56) References Cited

U.S. PATENT DOCUMENTS

| | | | | |
|---|---|---|---|---|
| 5,056,640 A | * | 10/1991 | Yamamoto | B60K 17/3505 |
| | | | | 192/85.02 |
| 5,063,738 A | * | 11/1991 | Asano | F16D 35/00 |
| | | | | 60/329 |
| 5,526,912 A | * | 6/1996 | Gassmann | B60K 17/20 |
| | | | | 192/85.02 |
| 8,701,707 B2 | | 4/2014 | Moosmann et al. | |
| 9,528,436 B2 | | 12/2016 | Kasuya et al. | |
| 11,525,525 B2 | * | 12/2022 | Eilers | F16K 47/06 |

FOREIGN PATENT DOCUMENTS

GB    1050929 A  *  1/2013  ......... F16D 25/0638

\* cited by examiner

*Primary Examiner* — Stacey A Fluhart
(74) *Attorney, Agent, or Firm* — McCoy Russell LLP

(57) ABSTRACT

Methods and systems are provided for a transmission clutch. In one example, the clutch has a pressure control system that includes a piston housing enclosing a piston cavity and a piston, as well as a diffusor positioned in the piston cavity. The diffusor may have tangential channels for directing flow of a fluid into the piston cavity.

20 Claims, 8 Drawing Sheets

WET CLUTCH PRESSURE CONTROL

CROSS REFERENCE TO RELATED APPLICATION

The present application claims priority to U.S. Provisional Application No. 63/499,145, entitled "WET CLUTCH PRESSURE CONTROL", and filed on Apr. 28, 2023. The entire contents of the above-listed application are hereby incorporated by reference for all purposes.

TECHNICAL FIELD

The present description relates generally to methods and systems for a vehicle transmission.

BACKGROUND AND SUMMARY

A powertrain of a vehicle may include a transmission that relies on opening and closing of wet clutches to shift between drive gears or gearsets. In order to shift smoothly between gears, e.g., without abrupt variations in torque output, control of clutch pressure may be demanded. For example, for wet clutches, an inflow of hydraulic fluid into a cavity of a wet clutch piston may apply a non-uniform hydraulic pressure on the piston during engagement of the wet clutch. The non-uniform pressure may cause the piston to tilt while translating towards a clutch pack of the wet clutch.

The tilting of the piston may cause an initial point of contact of the piston with the clutch pack to become spread over a duration of time. For instance, when the piston is aligned parallel to a surface of the clutch pack, an initial, single contact point between the piston and the surface of the clutch pack may be maintained, allowing torque to be transferred to the wet clutch in a uniform, constant manner. When the piston is not aligned parallel to the surface of the clutch pack, the piston may initially contact the surface of the clutch pack at one point but, as the hydraulic pressure increases in the cavity, the piston alignment changes until the piston becomes parallel to the surface of the clutch pack. During a period of time for the piston to align parallel to the surface of the clutch pack, torque transfer through the wet clutch may be uncontrolled which may lead to occurrence of shocks and/or torque oscillations in a driveline of the vehicle. Shifting may be jerky and unpleasant for a driver and passengers of the vehicle.

In one example, the issues described above may be addressed by a pressure control system for a clutch. The pressure control system may include a piston housing enclosing a piston cavity and a piston as well as a diffusor positioned in the piston cavity. The diffusor may have tangential channels for directing flow of a fluid into the piston cavity. In this way, gear shifts facilitated by the clutch may be smooth, without occurrence of shocks or torque oscillations, relative to the example discussed above.

As one example, the tangential channels of the diffusor may cause an inflow of the fluid into the cavity to slow down without transferring momentum to the piston. Impact of the inflow on the piston along an axial direction is thereby mitigated. Further, a combination of a volume of the piston cavity and a return force exerted by at least one return spring may maintain a perpendicular alignment of the piston with an axial direction, thereby allowing the piston to contact a clutch pack of the clutch across an entire circumference at a single point in time.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
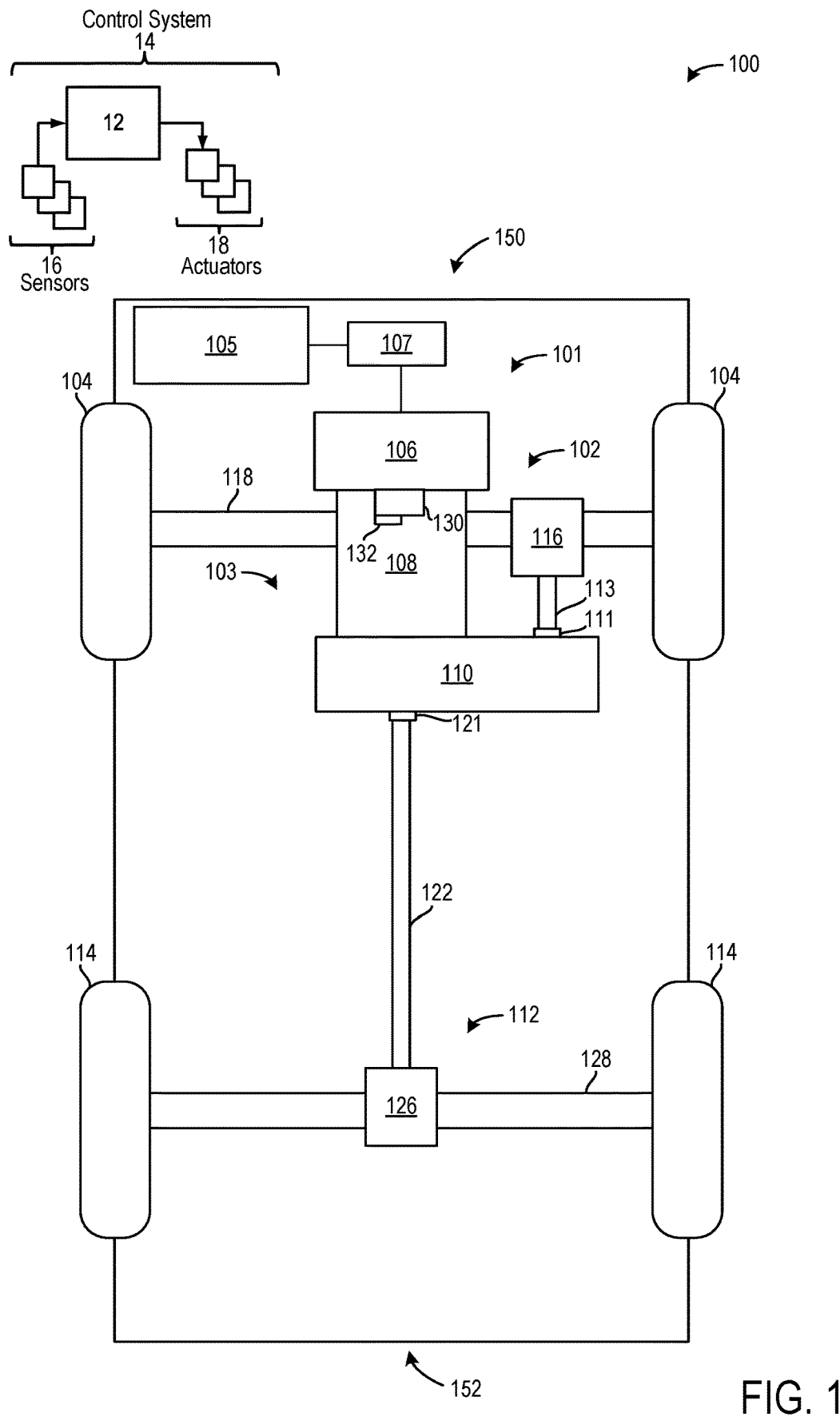
FIG. 1 shows a schematic depiction of an example vehicle powertrain, which may include a pressure control system for regulating pressure in a clutch.
Figure 2:
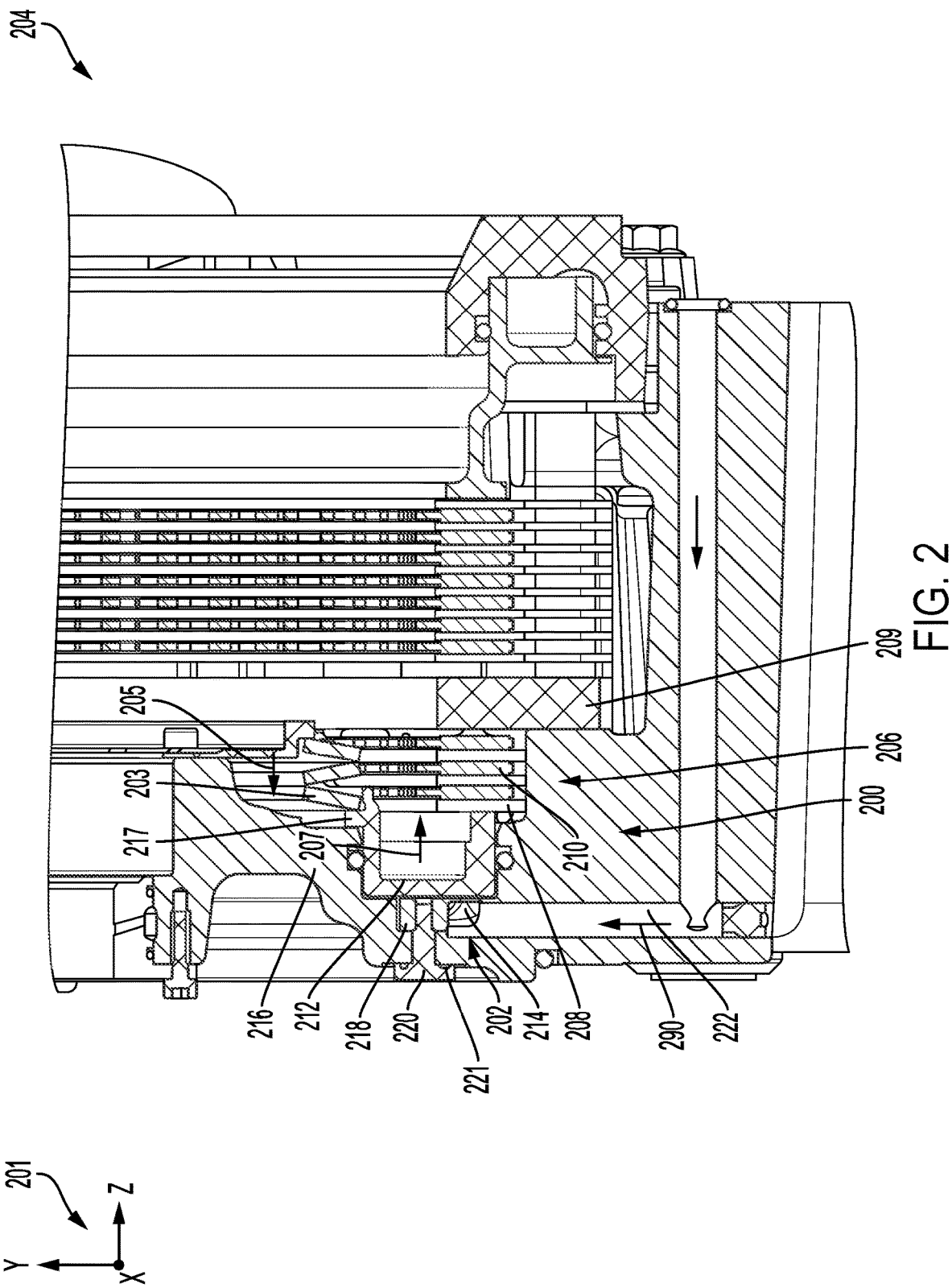
FIG. 2 shows a cut-away view of a clutch adapted with a pressure control system.
Figure 3:
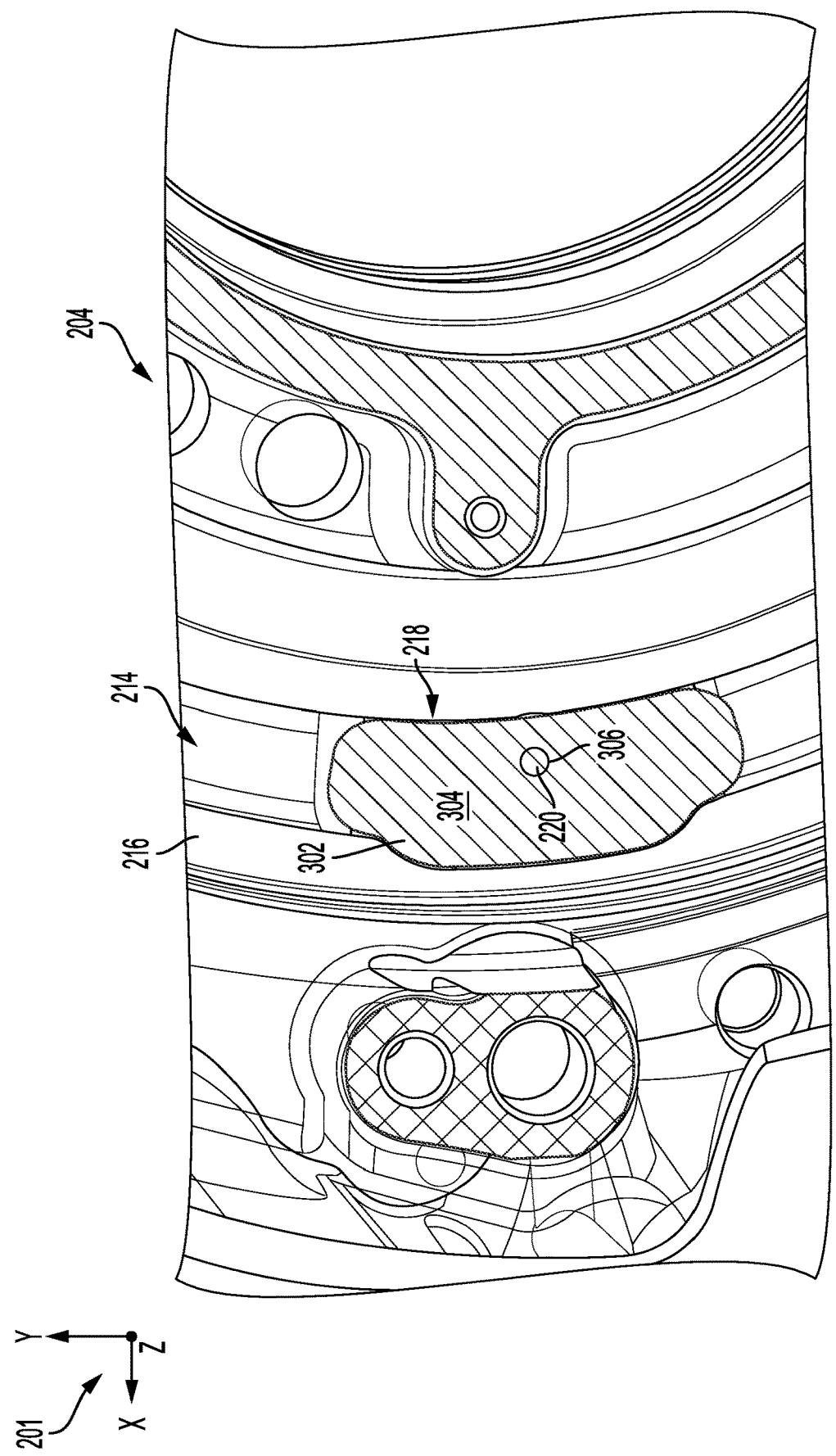
FIG. 3 shows a first view of a diffusor of the clutch of FIG. 2.
Figure 4:
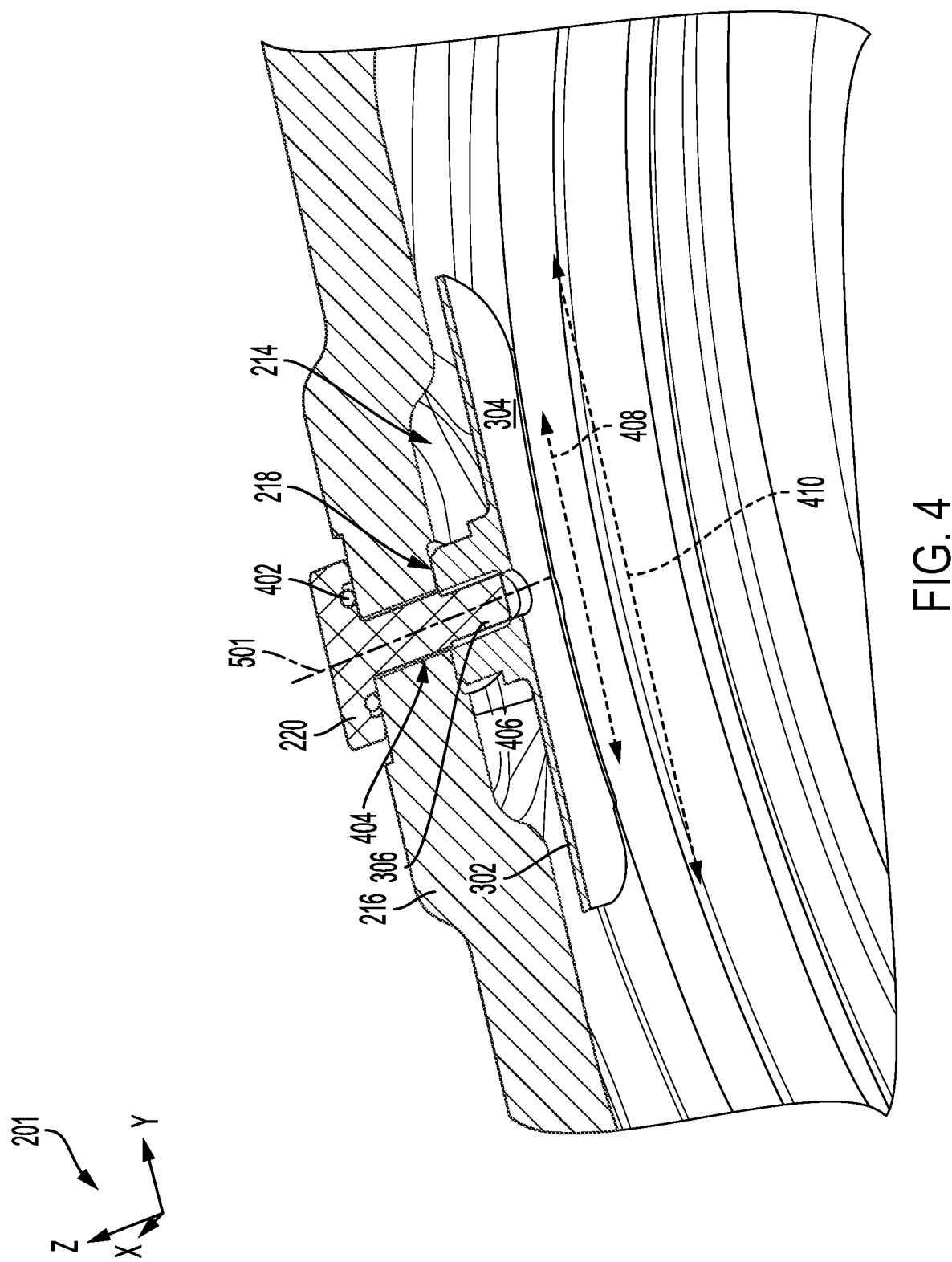
FIG. 4 shows a second view of the diffusor of FIG. 3.
Figure 5:
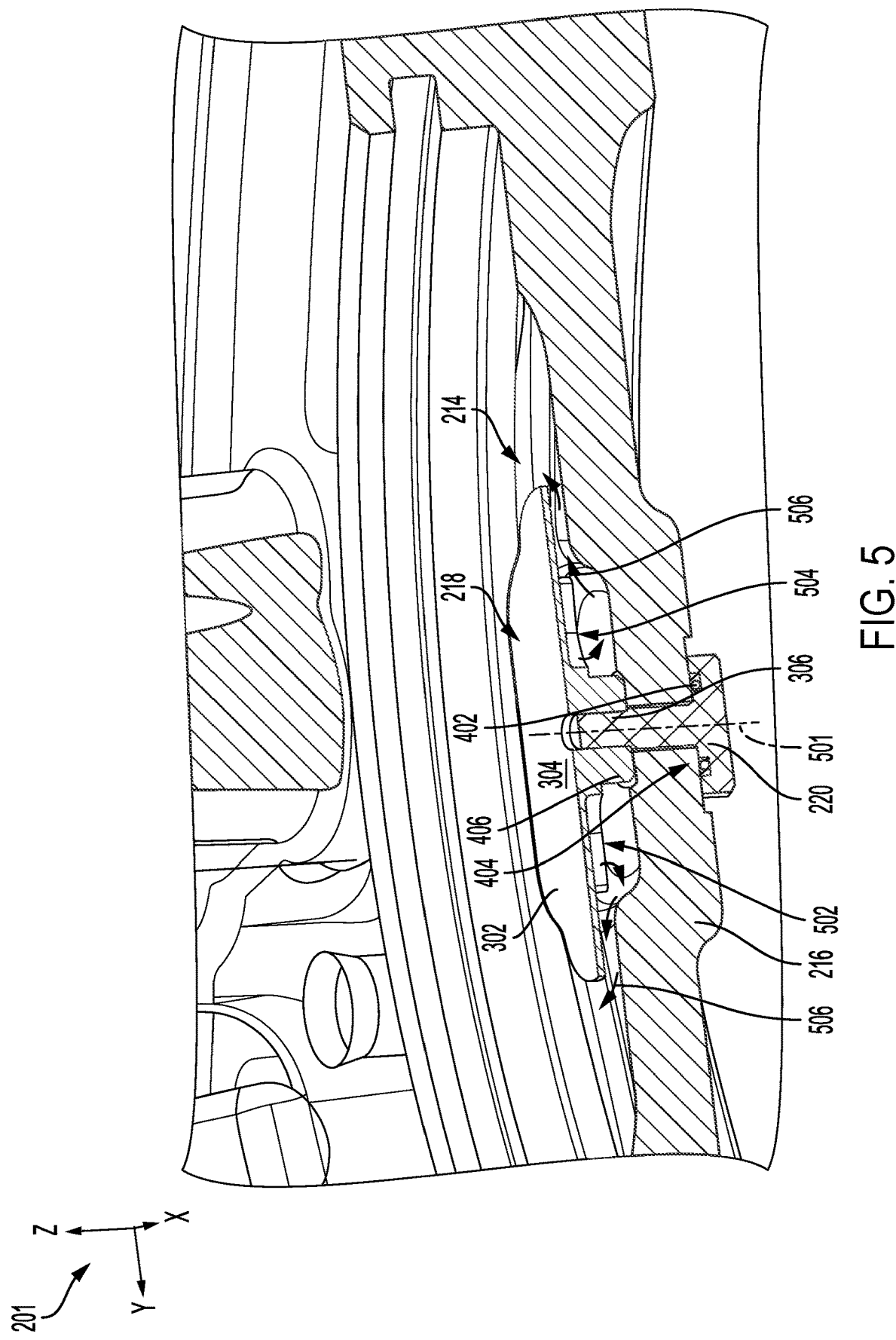
FIG. 5 shows a third view of the diffusor of FIG. 3.
Figure 6:
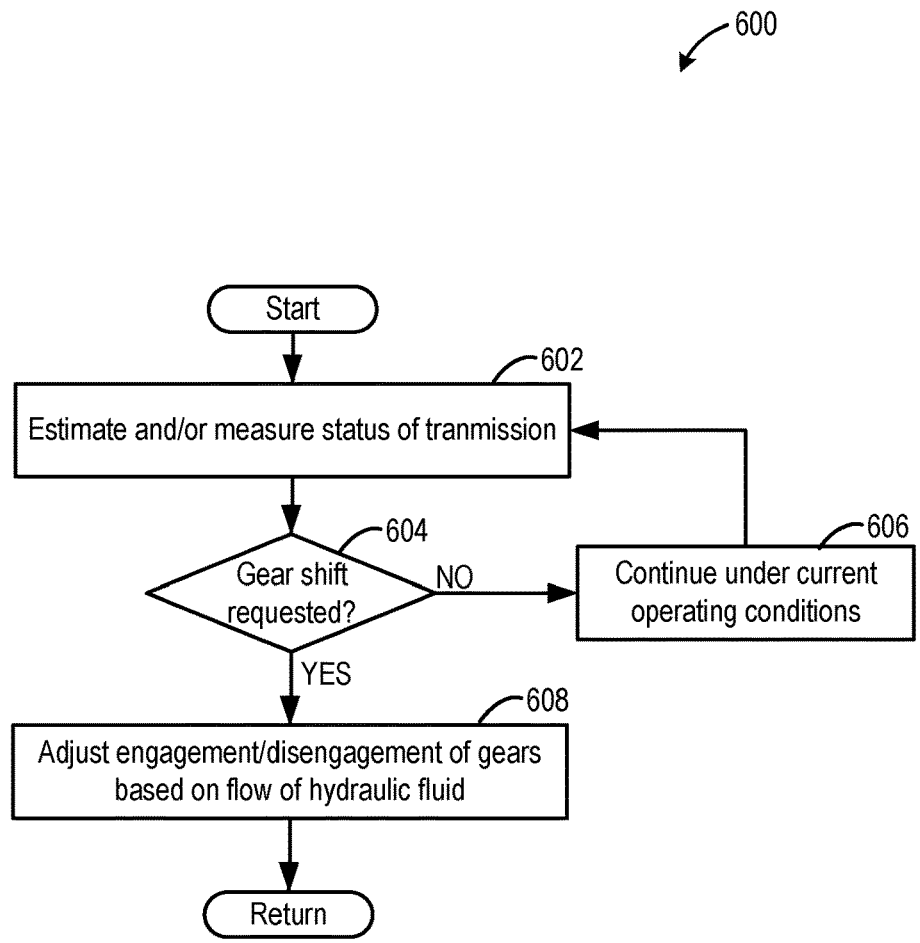
FIG. 6 shows an example of a method for shifting gears at a transmission having at least one clutch with a pressure control system.

The following description relates to systems and methods for a wet clutch. The wet clutch may be included in a vehicle powertrain, an example of which is depicted in FIG. 1, to facilitate engaging and disengaging of gears or gearsets at, for example, a vehicle transmission. For example, the vehicle transmission may be an automatic transmission where gear shifts are performed by opening and closing wet clutches. The opening and closing of the wet clutches may be actuated via hydraulic pressure changes at the wet clutches which may compel movement of a piston of the wet clutches. Translation of the piston may be maintained aligned with an axial direction by configuring the wet clutches with a pressure control system, as shown in FIG. 2. The pressure control system includes a piston cavity having a target volume and a diffusor controlling inflow of hydraulic fluid into the piston cavity. Different views of the diffusor are illustrated in FIGS. 3-5. A method for implementing gear shifts at a transmission, the transmission configured with a clutch having the pressure control system described herein, is shown in FIG. 6.

Turning first to FIG. 1, a vehicle 100 is depicted having a powertrain 101 and a drivetrain 103. The powertrain comprises a prime mover 106 and a transmission 108. The prime mover 106 may be an internal combustion engine and/or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

In one example, the transmission 108 may be an automatic transmission that includes more than one clutch for engaging and disengaging gears and brakes of the automatic transmission. The more than one clutch may be represented generally as a clutch 130 in FIG. 1, where the clutch 130 may rely on translation of a piston according to changes in hydraulic pressure and may be arranged in the transmission 108 to enable shifting between gears. It will be appreciated that the clutch 130 of FIG. 1 is a general depiction of where the clutch 130 is located and not representative of an actual location within the transmission 108. Further, as described above, more than one clutch 130 may be included in the transmission 108. Additional details of the clutch 130, and pressure control system of the clutch 130, are provided further below. Furthermore, the dual-clutch automatic transmission, as described above, is a non-limiting example of a clutch environment that the pressure control system may be implemented in. As well, the pressure control system may be applied to various types of wet clutches, such as a brake, as one example.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC).

The vehicle 100 may be a commercial vehicle, light, medium, or heavy duty vehicle, a passenger vehicle, an off-highway vehicle, and or utility vehicle. Additionally or alternatively, the vehicle 100 and/or one or more of its components may be used in industrial, locomotive, military, agricultural, and aerospace applications. In one example, the vehicle 100 is an electric vehicle.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged proximate to a front end 150 of the vehicle 100 and thereby comprises a front axle, and the second axle assembly 112 is arranged proximate to a rear end 152 of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Furthermore, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

The vehicle 100 may further include a control system 14. The control system 14 is shown receiving information from a plurality of sensors 16 and sending control signals to a plurality of actuators 18. As one example, sensors 16 may include at least one clutch sensor 132 for monitoring a position of the clutch 130. Other sensors such as pressure, temperature, air/fuel ratio, and composition sensors when the prime mover 106 includes the engine, may be coupled to various locations in the vehicle 100. The plurality of actuators may include valves controlling flow of hydraulic fluid through the clutch 130. The control system 14 may include a controller 12 which may receive input data from the various sensors, process the input data, and trigger the plurality of actuators 18 in response to the processed input data, based on instruction or code programmed therein, corresponding to one or more routines. In particular, the controller 12 may be a microcomputer, including microprocessor units, input/output ports, an electronic storage medium for executable programs and calibration values such as a read only memory chip, random access memory, keep alive memory, and a data bus.

As described above, a transmission of a vehicle may include at least one clutch facilitating drive gear shifts at the transmission. The clutch may be a wet clutch where engagement of a gear of the transmission is enabled when a hydraulic fluid flows into the clutch and increases a hydraulic pressure in the clutch, causing translation of a piston towards a clutch pack of the clutch, against an opposing spring force. When the hydraulic pressure is released, the opposing spring force drives motion of the piston away from the clutch pack, thereby disengaging the gear.

When engagement of the gear of the transmission is requested, the piston initially does not exert any force on the clutch pack, the clutch pack being an assembly of separator discs and friction discs. As the hydraulic fluid is delivered to the clutch, e.g., into a piston cavity, the piston begins to travel towards the clutch pack during a filling phase until the piston comes into contact with the clutch pack. Initial contact of the piston with the clutch pack may be referred to a kiss point and when the piston is aligned with an axial direction while moving, the kiss point may be a single point of contact.

From the kiss point onwards, torque may be transferred from an input shaft to the gear via friction generated through the clutch, which may correspond to a modulation phase. During the modulation phase, hydraulic fluid does not flow into the piston cavity but the hydraulic pressure in the clutch increases according to a modulation profile. The modulation profile may be selected according to, for example, a feed-forward algorithm based on initial conditions. In another example, the modulation profile may be selected based on an algorithm with a feedback loop controlling parameters such as clutch slip speed (e.g., a speed between the friction discs and the separator discs of the clutch pack).

In some instances, however, the piston may not translate while remaining aligned with the axial direction during the filling phase. Instead, the piston may become tilted relative to the axial direction and when tilted, the kiss point may be spread over a duration of time, rather than being a single point of initial contact that remains constant, until the piston becomes aligned with the axial direction. As such, instead of a kiss point, contact between the piston and the clutch assembly may occur over a kiss phase which may end when the piston is no longer tilted. Torque is transferred to the gear at a start of the kiss phase and continues over the duration of the kiss phase.

When the contact between the piston and the clutch pack occurs as a kiss phase rather than the kiss point, shocks and/or torque oscillations may occur in a driveline, e.g., drivetrain and powertrain, of the vehicle. A smoothness of gear shifting may be decreased as a result, which may increase noise, vibrations, and harshness (NVH). A gear shift with decreased smoothness may be further caused in clutch configurations where an inflow direction of the hydraulic fluid is axial, causing the hydraulic fluid to impinge on the piston in a direction perpendicular to a surface of the piston upon entering the piston cavity. Additionally, the gear shift quality may be exacerbated when an inflow speed of the hydraulic fluid is relatively fast due to relatively narrow fluid channel diameters. Further still, shocks and/or torque oscillations may become pronounced when a flow rate of the hydraulic fluid is high, such as when the clutch is large with a correspondingly large piston surface or when a number of discs in the clutch pack is increased, which leads to increased travel distances for the piston during the filling phase.

To mitigate rough gear shifting resulting from tilting of a piston of a clutch, the clutch may, in one example, be configured with a pressure control system including a relatively large piston cavity volume and a diffusor directing inflow of hydraulic fluid into a piston cavity. An example of a clutch 200, e.g., a wet clutch configured as a brake, having a pressure control system 202 is depicted in FIG. 2 in a cut-away view. A set of reference axes 201 is provided, indicating a y-axis, an x-axis, and a z-axis.

The clutch 200 may be coupled to a portion of a transmission 204, which may be an embodiment of the transmission 108 of FIG. 1, while the clutch 200 may be an example of the clutch 130 of FIG. 1. In one example, the clutch 130 may be coupled to a brake portion of the transmission 204. A clutch pack 206 of the clutch 200 may include an alternating arrangement of a plurality of separator discs 208 and a plurality of friction discs 210 stacked along the z-axis, which may be perpendicular to an axial direction of the clutch 200. The clutch pack 206 may be arranged between a piston 212 of the clutch 200 and an end plate 209. For example, an outermost surface of the clutch pack 206 may be in contact with an end of the piston 212 when the clutch 200 is in a closed position and an innermost surface of the clutch pack 206 may abut the end plate 209, the outermost and innermost surfaces aligned with the y-x plane. The piston 212 may be aligned with the clutch pack 206 along axial direction and located in a piston cavity 214 of the clutch 200.

The piston 212 may include an annular shape extending around an entire circumference of a shaft or a central axis of the transmission 204. The piston cavity 214 may extend adjacent to the piston 214. The piston cavity 214 is shown in greater detail with respect to FIG. 8. The piston cavity 214 may extend around a majority of the circumference of the piston 212. A stop 802 is arranged between extreme ends of the piston cavity 214.

The piston 212 may include an extension 217 that protrudes in a direction normal to a direction of piston movement. The extension 217 may provide a rigid surface through which a force exerted by at least one return spring 203 is transmitted to the piston 212. The force exerted by the return spring 203 is indicated by arrow 205, which may be a return force.

Figure 7:
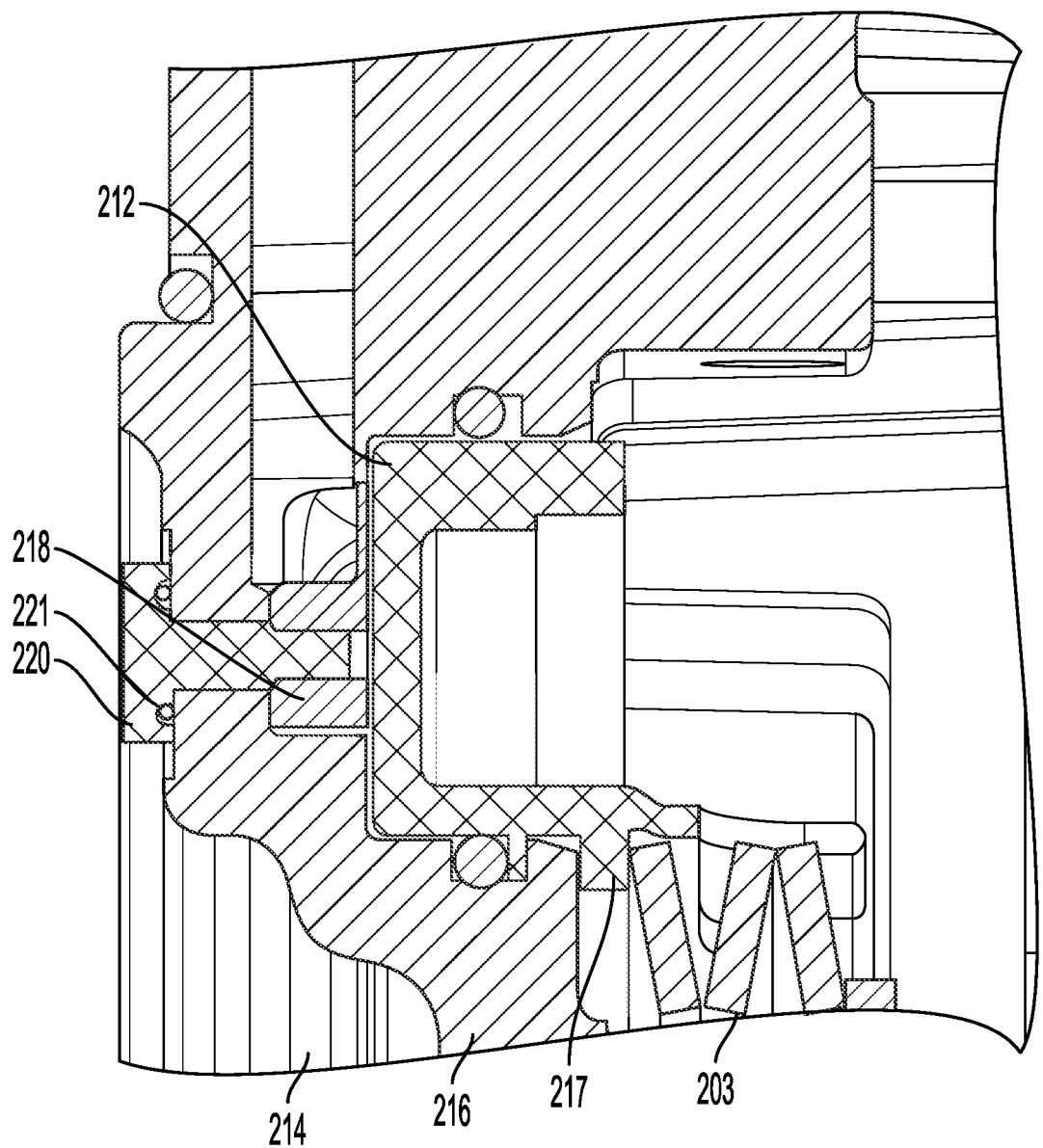
FIG. 7 shows a detailed view of the diffusor adjacent to a portion of the piston.

FIG. 7 illustrates a detailed view of the piston 212 in a resting position. When in the resting position, the return spring 203 presses the piston 212 away from the clutch pack 206 so that the extension 217 is pressed against a piston housing 216. A clearance may be between the diffusor 218 and the piston 212 when the piston 212 is in the resting position. As such, an amount of fluid may trickle into the clearance when in the resting position. The clearance between the diffusor 218 and the piston 212 may increase when the piston 212 is moved out of the resting position.

The piston cavity 214 may be included in the pressure control system 202 of the clutch 200, as well as a diffusor 218. The diffusor 218 may be coupled to the piston housing 216 and enclosed within the piston housing 216. An interface between the diffusor 218 and the piston housing 216 may optionally be sealed, thereby inhibiting loss of a hydraulic fluid (such as oil) when the hydraulic fluid flows in the piston cavity 214, thereby forcing the outflow to be tangential and not radial or axial. However, in other examples, leak tightness may not be demanded as the diffusor 218 may mitigate impact of the flow on the piston 212 sufficiently without additional sealing. Thus, in some examples, the interface between the diffusor 218 and the piston housing 216 may not be sealed. A bolt 220 may be used to maintain a position of diffusor 218 within the clutch 200 and absorb at least a portion of an impact of a force imposed by the inflow of the hydraulic fluid. The bolt interface with the piston housing 216 may be sealed to avoid leaks therethrough.

In one example, the piston housing 216 consists of a casted part that shapes the cavity 214 or pocket for the clutch 200. The cavity 214 may include an extra pocket to allow lubricant to flow therethrough.

Figure 8:
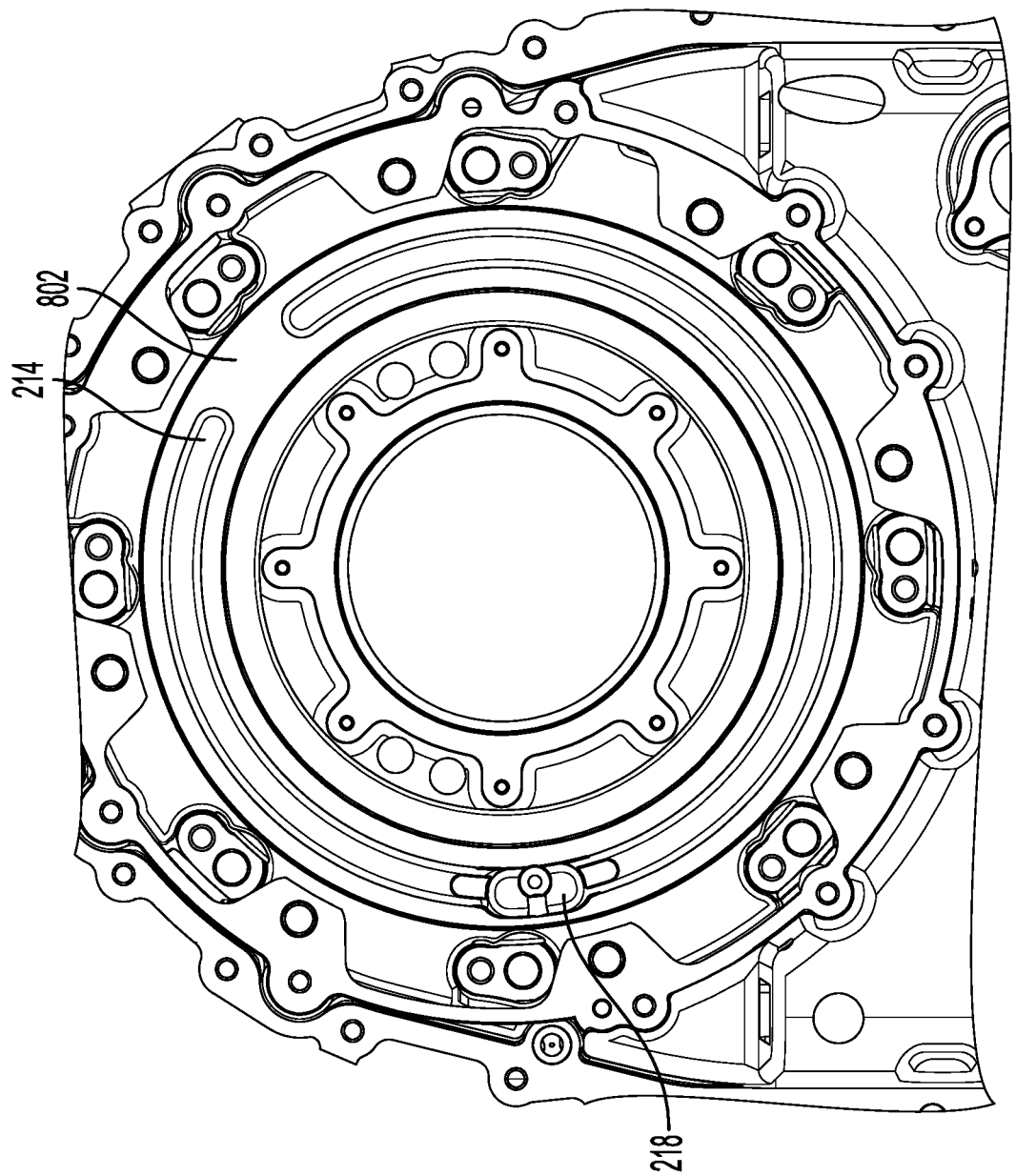
FIG. 8 shows a location of the diffusor within a piston cavity.

The bolt 220 may include seals 221 that block fluid from leaving the piston cavity 214 through the diffusor. An example location of the diffusor 218 in the piston cavity 214 is shown in FIG. 8. As illustrated, the diffusor 218 may be biased toward one of the extreme ends of the piston cavity pocket.

The diffusor 218 is shown in greater detail in FIGS. 3-5 and 7, and described further below. The diffusor 218 is also included in the pressure control system 202 of the clutch 200 and may be positioned at an intersection between an inflow channel 222 of the clutch 200 and the piston cavity 214. The inflow channel 222 may deliver the hydraulic fluid to the piston cavity 214 from a source of the hydraulic fluid. Fluid flow through the inflow channel 222 is shown via arrows 290. For example, the hydraulic fluid may be stored at a sump and flow of the hydraulic fluid may be driven by a pump. The inflow channel 222 may be oriented aligned with the axial direction and may deliver the hydraulic fluid to the diffusor 218 along the axial direction.

When an actuation of the brake 200 is requested, the hydraulic fluid may be delivered through the inflow channel 222 to the piston cavity 214. In one example, the brake is a brake clutch and the clutch 200 may be configured as a brake clutch. The piston cavity 214 may not be pressurized prior to initiation of the gear shift, with the piston 212 spaced away from the outermost surface of the clutch pack 206. The piston 212 therefore is not in contact with the clutch pack 206. Upon initiation of the brake actuation, the hydraulic fluid may flow into the piston cavity 214 during a filling phase of clutch operation, as described previously. As a volume of the hydraulic fluid in the piston cavity 214 increases, a pressure in the piston cavity 214 may rise due to force exerted by the return spring 203, driving translation of the piston 212 against the return spring 203 and towards the clutch pack 206, as indicated by arrow 207. The pressure exerted against the piston 212 may be less localized than the previous examples without the diffusor 218. By bifurcating the flow of fluid into the piston cavity 214, the pressure of fluid flowing into the piston cavity 214 may equilibrate more quickly with fluid already in the piston cavity 214. By doing this, pressure hot spots against the piston 212 may be mitigated.

As the piston 212 slides towards the clutch pack 206, the piston 212 may contact the outermost surface of the clutch pack 206 at a single point, e.g., a kiss point, when the piston 212 is maintained aligned with the axial direction (e.g., the z-axis) during the filling phase of the clutch operation. At the kiss point, a modulation phase begins and torque is transmitted from an input torque source, such as an input shaft, to a housing of the brake which is coupled to the transmission housing and thus stationary. The gear is thereby engaged by the clutch 200 (e.g., the clutch 200 is closed). The torque transfer occurs as a result of the contact between the piston 212 and the clutch pack 206, which allows the piston 212 to exert a compressive force on the clutch pack 206 in the direction indicated by arrow 207. As the hydraulic pressure in the piston cavity 214 rises, the compressive force imposed by the piston on the clutch pack 206 may increase to a maximum force, which may be determined based on a modulation profile or a feedforward algorithm, as described previously.

Compression of the clutch pack 206 causes the separator discs 208 and the friction discs 210 to be pressed against one another between the piston 212 and the end plate 209. The compressed clutch pack 206 applies braking to the input shaft based on friction, driving rotation of the gear in unison with the input torque source. When a subsequent gear shift is requested, the hydraulic fluid may flow out of the piston cavity 214 to alleviate the hydraulic pressure. As the hydraulic pressure decreases within the piston cavity 214, the return force exerted by the spring force compels translation of the piston away from the clutch pack 206, thereby decompressing the clutch pack and releasing the clutch 200 from the gear (e.g., the clutch 200 is opened).

The pressure control system 202 may circumvent tilting of the piston 212 during the filling phase where the piston 212 is sliding towards the clutch pack 206. For example, a size, e.g., volume of the piston cavity 214 may be a threshold size to impose a single pressure value on the piston 212. The threshold size may be based on a flow rate of the hydraulic fluid and a size configured to apply a uniform pressure at a highest magnitude of the flow rate. As an example, a cross-sectional area of a flow region of the piston cavity 214 may be at least two times a cross-sectional area of a volume of the inflow channel 222 when the piston 212 is in a kiss position, e.g., touching the clutch pack 206. Any imbalances due to increased friction on one side of the piston 212 may be balanced by an increased return force at a region of the return spring 203 proximate and corresponding to the compromised side of the piston 212. Tilting of the piston 212 may thereby be compensated for based on control of hydraulic pressure experienced by the piston 212 and the return force of the return spring 203 that increases in response to tilting of the piston 212.

Further, an impact of an inflow of the hydraulic fluid on the piston 212 may be modulated via the diffusor 218. By positioning the diffusor 218 at the intersection of the inflow channel 222 and the piston cavity 214, the inflow may be directed in a manner that precludes impinging of the inflow on the piston 212 along the axial direction. Instead, the diffusor 218 may receive the hydraulic fluid along a direction perpendicular to the axial direction. The hydraulic fluid may be directed through at least two tangential, e.g., helical, channels disposed therein to introduce the hydraulic fluid into the piston cavity 214 by swirling the inflow. The hydraulic fluid therefore flows out of the diffusor 218 and into the piston cavity 214 along helical paths. The diffusor 218 may thereby diffuse the impact of the inflow on the piston 212 by enabling the hydraulic fluid to contact the piston 212 evenly and uniformly such that the impact is not concentrated or unevenly distributed at any region of the piston surface.

The diffusor 218 is depicted in FIG. 3 from a view along the axial direction (e.g., the z-axis) and along the direction indicated by arrow 205 of FIG. 2, shown in FIG. 4 in a cut-away view along the x-y plane, and illustrated in FIG. 5 in a cut-away view also along the x-y plane but from an opposite perspective relative to FIG. 4. As shown in FIGS. 4 and 5, the diffusor 218 may be positioned inside of the piston cavity 214 and secured to the piston housing 216 by the bolt 220. A sealing device, such as an O-ring 402, may be arranged at an interface between the bolt 220 and the piston housing 216 to ensure a sealing engagement of the bolt with the piston housing 216 such that the hydraulic fluid does not leak out of an aperture 404 of the piston housing 216 for receiving the bolt 220.

As shown in FIG. 3, the diffusor 218 may include a plate 302 with a first face 304 that forms a smooth, continuous, uninterrupted surface except for an opening 306 for receiving the bolt 220. The plate 302 is oriented perpendicular to the axial direction, e.g., arranged co-planar with the y-x plane. The plate 302 may have a curved outer geometry, as shown in FIG. 3, which is a non-limiting example of the outer geometry of the plate 302. For example, a variety of outer geometries are possible for the plate 302. Further, relative dimensions of the plate, including a thickness, length, and width, may vary from that shown without departing from the scope of the present disclosure.

Turning to FIGS. 4 and 5, the plate 302 of the diffusor 218 is shown spaced away from the piston housing 216 and not in direct contact with the piston housing 216. The diffusor 218 also has a protrusion 406 that extends between the plate 302 and the piston housing 216 and is continuous with the plate 302. In other words, the diffusor 218 is a single, continuous structure formed of the plate 302 and the protrusion 406. The opening 306 may extend entirely through the protrusion 406 along the z-axis, providing a sleeve for receiving and mating with a portion of the bolt 220. As indicated in FIG. 4, a diameter 408 of the protrusion 406 at its widest region may be narrower than a width 410 (or length) of the plate 302.

As shown in FIG. 5, the protrusion 406 may include a first channel 502 and a second channel 504 extending through a material of the diffusor 218, forming helical paths through the diffusor 218. The first and second channels 502, 504 may fluidly couple the inflow channel 222 (as shown in FIG. 2)

to the piston cavity 214. The first and second channels 502 be arranged opposite of one another across a central axis 501 of the diffusor 218, and may expel the inflow of the hydraulic fluid into a region of the piston cavity 214 between the piston housing 216 and the plate 302 of the diffusor 218, as indicated by arrows 506. The perpendicular alignment of the plate 302 relative to the axial direction and parallel with the piston housing 216 may force the hydraulic fluid to initially flow in a direction perpendicular to the axial direction upon entering the piston cavity 214. The hydraulic fluid may flow from the first and second channels 502, 504, into the region of the piston cavity 214 between the piston housing 216 and the plate 302, and around edges of the plate 302. The inflow paths through the diffusor 218 may compel tangential flow of the hydraulic fluid such that the hydraulic fluid is swirled along dual helical paths into a region of the piston cavity between the plate 302 of the diffusor 218 and the piston 212 (as shown in FIG. 2). The hydraulic fluid does not directly contact the piston 212 along the axial direction but is distributed tangentially across surfaces of the piston 212.

An example of a method 600 for operating one or more clutches of a vehicle to facilitate gear shift is shown in FIG. 6. The clutches may be similar to the clutch 200 of FIG. 2 and implemented in a transmission, such as the transmission 108 of FIG. 1. Instructions for carrying out the method may be executed by a controller, such as the controller 12 of FIG. 1, based on instructions stored on a memory of the controller and in conjunction with signals received from sensors of the engine system, such as the clutch sensor 132 described above with reference to FIG. 1. The controller may employ actuators of the vehicle to adjust transmission operation, according to the method described below.

At 602, the method includes estimating and/or measuring a current status of the transmission. For example, data from sensors of the transmission may be used to determine which gears of the transmission are engaged and disengaged based on positions of the clutches, a torque input to the transmission, a torque output from the transmission, etc. As one example, the transmission may include a first clutch configured to engage a first gear (or a first gearset) and a second clutch configured to engage a second gear (or a second gearset). The current status of the transmission may include the first clutch being disengaged from the first gear and the second clutch engaging the second gear.

At 604, the method includes confirming if a request for a gear shift is received. For example, the request may be indicated when a driver adjusts a position of a gear stick or gear lever of the vehicle. If the request for the gear shift is not received, the method proceeds to 606 to continue vehicle operations with the transmission in its current state. The method returns to 602 to monitor the status of the transmission.

If the gear shift request is received at 604, the method continues to 608 to adjust engagement and disengagement of the gears of the transmission. For example, the requested gear shift may be a shift from the second gear to the first gear. In response to the request, the first clutch may be actuated to close. Valves and pumps controlling flow of a hydraulic fluid may be adjusted and/or activated to deliver the hydraulic fluid to a piston cavity of the first clutch via an inflow channel. As the hydraulic fluid flows into the piston cavity, the hydraulic fluid first passes through a diffusor arranged at an intersection of the inflow channel with the piston cavity and positioned within the piston cavity. The hydraulic fluid is directed through tangential channels of the diffusor, causing the hydraulic fluid to swirl into the piston cavity which minimizes direct, axial impingement of the hydraulic fluid onto a piston of the first clutch. As the hydraulic fluid flows into the piston cavity, a pressure in the piston cavity rises and the piston is compelled to translate towards a clutch pack of the first clutch. An alignment of the piston with an axial direction is maintained due to application of a single magnitude of pressure onto the piston resulting from a volume capacity of the piston cavity and a return force imposed by at least one return spring of the clutch.

The first gear is thereby locked to the clutch based on friction generated between discs of the clutch pack of the first clutch. Torque from a torque input, such as an input shaft, may be transmitted to the first gear.

Additionally, in response to receiving the request for the gear shift, the second clutch may be adjusted to an open position to disengage the second gear. For example, adjustment of the valves and pumps to direct flow of hydraulic fluid to the first clutch may also include adjusting the valves and pumps to release hydraulic fluid from the second clutch, thereby dissipating the hydraulic pressure accumulated therein. As the hydraulic fluid flows out of a piston cavity of the second clutch and the hydraulic pressure in the piston cavity decreases, a return force of at least one return spring of the second clutch becomes greater than the hydraulic pressure. The return force compels translation of a piston of the second clutch away from a clutch pack of the second clutch. Torque is no longer transmitted to the second gear via the second clutch. The method returns to the start.

In this way, gear shifting at a transmission with wet clutches may be enabled without shocks or torque oscillations. By adapting at least one clutch of the transmission with a pressure control system including a relatively large piston cavity volume and a diffusor, hydraulic pressure and inflow of hydraulic fluid into the piston cavity may be moderated during a filling phase of clutch operation. The large piston cavity volume allows a single pressure value to be applied to the piston, thereby reducing a likelihood of the piston to become tilted during a filling phase of clutch operation. Contact between the piston and clutch pack of the clutch may occur at a single point of contact, e.g., a kiss point, rather than spread over a kiss phase. Any imbalances in friction experienced by the piston may be countered by a return force imposed by at least one return spring of the clutch. Furthermore, a direction and path of inflow of the hydraulic fluid into the piston cavity may be controlled by the diffusor, which may direct the inflow along tangential paths that reduces an impact of the inflow on the piston. The pressure control system described herein may provide a lost cost, simple mechanism that improves shift quality and allows clutch control to be less sensitive to variable initial conditions, such as slip speed and/or oil temperature.

FIGS. 2-5 and 7-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-5 and 7-8 are shown approximately to scale.

The disclosure provides support for a pressure control system for a clutch including a piston housing enclosing a piston cavity and a piston and a diffusor positioned in the piston cavity, the diffusor comprising a plurality of tangential channels for directing flow of a fluid into the piston cavity. A first example of the pressure control system further includes where the diffusor is located at an intersection of an inflow channel and the piston cavity, and wherein the inflow channel delivers the fluid to the piston cavity. A second example of the pressure control system, optionally including the first example, further includes where the diffusor has a plate arranged perpendicular to an axial direction of the clutch and a shank extending between the plate and the piston housing. A third example of the pressure control system, optionally including one or more of the previous examples, further includes where the plurality of tangential channels of the diffusor expel the fluid into a region of the piston cavity between the plate and the piston housing. A fourth example of the pressure control system, optionally including one or more of the previous examples, further includes where the fluid flows perpendicular to the axial direction upon entering the piston cavity and, upon flowing around edges of the plate, enters a region of the piston cavity between the plate and the piston along helical paths. A fifth example of the pressure control system, optionally including one or more of the previous examples, further includes where the piston is arranged between a plurality of friction plates and the diffusor. A sixth example of the pressure control system, optionally including one or more of the previous examples, further includes where the diffusor is coupled to the piston housing by a bolt extending through the piston housing, wherein the bolt seals the diffusor. A seventh example of the pressure control system, optionally including one or more of the previous examples, further includes where the plurality of tangential channels of the diffusor fluidly couple an inflow channel to the piston cavity. An eighth example of the pressure control system, optionally including one or more of the previous examples, further includes where at least one return spring that exerts a return force on an extension of the piston in a direction away from a clutch pack of the clutch.

The disclosure provides additional support for a method for a transmission including responsive to a request for engaging a first gear, delivering a hydraulic fluid to a first clutch coupled to the first gear through a diffusor of the first clutch, wherein the hydraulic fluid flows out of the diffusor and into a piston cavity of the first clutch in a direction parallel to a piston surface against which the hydraulic fluid presses. A first example of the method further includes where delivering the hydraulic fluid to the first clutch includes flowing the hydraulic fluid through tangential channels of the diffusor. A second example of the method, optionally including the first example, further includes where the diffusor splits the hydraulic fluid flow into different portions of the piston cavity. A third example of the method, optionally including one or more of the previous examples, further includes disengaging a second gear in response to the request for engaging the first gear by releasing the hydraulic fluid from a second clutch coupled to the second gear. A fourth example of the method, optionally including one or more of the previous examples, further includes delivering the hydraulic fluid to the first clutch includes exerting a single pressure on a piston as the piston moves towards a clutch pack of the first clutch. A fifth example of the method, optionally including one or more of the previous examples, further includes a return force exerted by a return spring balances friction applied to the piston to maintain an alignment of the piston perpendicular to an axial direction.

The disclosure provides further support for a transmission including a gear, and a clutch coupled to the gear, the clutch having a diffusor to decrease impingement of a hydraulic fluid on a piston of the clutch, and wherein a piston cavity of the clutch has a volume configured to exert a single pressure value on the piston to maintain, in combination with a return force of at least one return spring, an alignment of the piston along a direction perpendicular to an axial direction. A first example of the transmission further includes where the diffusor is entirely enclosed within the piston cavity and is configured to distribute hydraulic fluid to different portions of the piston cavity, and where hydraulic fluid bypasses a portion of the piston adjacent to the diffusor. A second example of the transmission, optionally including the first example, further includes where the diffusor receives the hydraulic fluid from an inflow channel along a direction parallel to the axial direction and expels the hydraulic fluid into the piston cavity via the diffusor along tangential paths. A third example of the transmission, optionally including one or more of the previous examples, further includes where the volume of the piston cavity is configured to comprise a single pressure exerted against a surface of the piston to overcome the force of the at least one return spring, the piston cavity extending around a majority of a circumference of the piston. A fourth example of the transmission, optionally including one or more of the previous examples, further includes where a clearance is arranged between the diffusor and the piston.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A pressure control system for a clutch, comprising:
   a piston housing enclosing a piston cavity and a piston; and
   a diffusor positioned in the piston cavity, the diffusor comprising a plurality of tangential channels for directing flow of a fluid into the piston cavity, wherein the diffusor is coupled to the piston housing by a bolt extending through the piston housing.

2. The pressure control system of claim 1, wherein the diffusor is located at an intersection of an inflow channel and the piston cavity, and wherein the inflow channel delivers the fluid to the piston cavity.

3. The pressure control system of claim 1, wherein the diffusor has a plate arranged perpendicular to an axial direction of the clutch and a protrusion extending between the plate and the piston housing.

4. The pressure control system of claim 3, wherein the plurality of tangential channels of the diffusor expel the fluid into a region of the piston cavity between the plate and the piston housing.

5. The pressure control system of claim 4, wherein the fluid flows perpendicular to the axial direction upon entering the piston cavity and, upon flowing around edges of the plate, enters a region of the piston cavity between the plate and the piston along helical paths.

6. The pressure control system of claim 1, wherein the piston is arranged between a plurality of friction plates and the diffusor.

7. The pressure control system of claim 1, wherein the bolt seals the diffusor.

8. The pressure control system of claim 1, wherein the plurality of tangential channels of the diffusor fluidly couple an inflow channel to the piston cavity.

9. The pressure control system of claim 1, further comprising at least one return spring that exerts a return force on an extension of the piston in a direction away from a clutch pack of the clutch.

10. A method for a transmission, comprising:
    responsive to a request for engaging a first gear,
    delivering a hydraulic fluid to a first clutch coupled to the first gear through a diffusor of the first clutch, wherein the hydraulic fluid flows out of the diffusor and into a piston cavity of the first clutch in a direction parallel to a piston surface against which the hydraulic fluid presses, and wherein the diffusor has a plate arranged perpendicular to an axial direction of the clutch and a protrusion extending between the plate and the piston housing.

11. The method of claim 10, wherein delivering the hydraulic fluid to the first clutch includes flowing the hydraulic fluid through tangential channels of the diffusor.

12. The method of claim 10, wherein the diffusor splits the hydraulic fluid flow into different portions of the piston cavity.

13. The method of claim 10, further comprising disengaging a second gear in response to the request for engaging the first gear by releasing the hydraulic fluid from a second clutch coupled to the second gear.

14. The method of claim 10, wherein delivering the hydraulic fluid to the first clutch includes exerting a single pressure on a piston as the piston moves towards a clutch pack of the first clutch.

15. The method of claim 14, wherein a return force exerted by a return spring balances friction applied to the piston to maintain an alignment of the piston perpendicular to an axial direction.

16. A transmission, comprising:
    a gear; and
    a clutch coupled to the gear, the clutch having a diffusor arranged in a piston cavity, the diffusor comprising a plurality of tangential channels and configured to decrease impingement of a hydraulic fluid on a piston of the clutch, wherein a piston cavity of the clutch has a volume configured to exert a single pressure value on the piston to maintain, in combination with a return force of at least one return spring, an alignment of the piston along a direction perpendicular to an axial direction, and wherein a clearance is arranged between the diffusor and the piston.

17. The transmission of claim 16, wherein the diffusor is entirely enclosed within the piston cavity and is configured to distribute hydraulic fluid to different portions of the piston cavity, and wherein hydraulic fluid bypasses a portion of the piston adjacent to the diffusor.

18. The transmission of claim 16, wherein the diffusor receives the hydraulic fluid from an inflow channel along a direction parallel to the axial direction and expels the hydraulic fluid into the piston cavity via the diffusor along tangential paths.

19. The transmission of claim 16, wherein the volume of the piston cavity is configured to comprise a single pressure exerted against a surface of the piston to overcome the force of the at least one return spring, the piston cavity extending around a majority of a circumference of the piston.

20. The transmission of claim 16, wherein the clearance increases when the piston moves out of a resting position.

* * * * *